Feb. 13, 1940.  D. K. WRIGHT  2,190,528
ELECTRIC PROJECTION DEVICE
Original Filed March 13, 1936
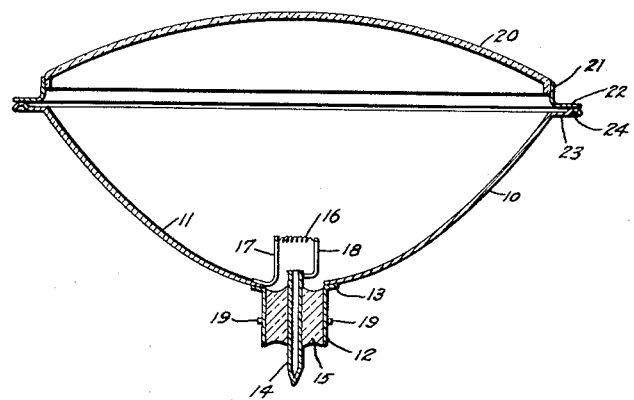
Inventor:
Daniel K. Wright,
by Harry E Dunham
His Attorney.

Patented Feb. 13, 1940

2,190,528

UNITED STATES PATENT OFFICE 2,190,528

ELECTRIC PROJECTION DEVICE

Daniel K. Wright, Cleveland Heights, Ohio, assignor to General Electric Company, a corporation of New York Application March 13, 1936, Serial No. 68,714
Renewed May 21, 1937

7 Claims. (Cl. 176—34)

My invention relates to light projecting devices comprising an enclosure or bulb, a portion of which is reflective of light. My invention may be applied to light projecting devices in which the light source is fixed at a definite point, such as the focal point of a reflector or other device for projecting the light. More particularly my invention may be applied to light projecting devices of the type in which a portion or section of the enclosure for the light source has a concave light-concentrating surface, such as a paraboloid, at the focus of which is located the filament or other light source. One of the advantages of such light projectors is that they may be made in small sizes for use as headlamps on vehicles such as automobiles and airplanes where the small-sized projector may be effectively incorporated in the stream lined design of the vehicle. Another advantage is the possibility of extremely accurate location of the light source with respect to the reflecting surface whereby a beam of the desired dimensions and direction may always be secured.

According to my invention the light projector comprises a concave metal reflector having a cover glass or lens sealed across the front thereof, the reflector and cover glass constituting an enclosure in which the filament or other light source is hermetically sealed. One of the features of my invention is the provision of a separate ring of metal sealed preferably by fusion directly to the cover glass, the said ring being in turn united to the reflector or to a flange thereon, preferably by welding. In this way the ring only may be made of a metal which seals directly to glass and the fusing heat is kept away from the silvered surface of the reflector. Further features and advantages of my invention will appear from the following detailed description of a species thereof and from the drawing.

The drawing is an elevation in section of a light projecting device comprising my invention.

Referring to the drawing, the projector comprises a concave metal reflector 10, preferably of paraboloidal shape, and having the inner surface 11 thereof silvered. A cylindrical metal base shell 12 has a flange portion 13 which is united, preferably by welding, to the rim of an opening at the apex of the reflector 10. A metal exhaust tube 14 extends through the base shell 12 and is sealed therein by a plastic insulating material 15, preferably glass. With a glass seal 15, the tube 14 and shell 12 may be made of an alloy known as Fernico and described in Patent No. 1,942,260, issued January 2, 1934 to Howard Scott, or of a chrome-iron alloy known as Allegheny 55, depending upon whether a hard or soft glass is used. A filament 16 is mounted on lead wires 17, 18 which may be spot welded to the reflector 10 and the exhaust tube 14 respectively. The filament 16 is located accurately with respect to the focus of the reflector 10. The said filament 16 may be located definitely by means of a suitable jig and then optically by placing the unit in a bottle containing a hydrogen or other non-oxidizing atmosphere, connecting the shell 12 and tube 14 to a source of electrical current to energize the filament, and observing the beam produced thereby on a screen. If the filament is not correctly located, an operator may reach into the bottle and slightly bend the leads 17, 18 to adjust the position of the filament. The filament is also located angularly with respect to outward projections such as pins 19 on the base shell 12.

The front of the reflector 10 is covered by a cover glass 20 which may be a plain glass, but for vehicle headlamp purposes is preferably a lens of suitable design having flutes and prisms to properly distribute the light. A ring 21 of metal or alloy such as Fernico or Allegheny 55 is sealed by fusion directly to the rim of the cover glass 20 and has an outwardly extending flange portion 22 which is in turn united, preferably by welding, to an outwardly extending flange 23 at the rim of the reflector 10, or to an annular protuberance 24 thereon. In this way, the silver or other reflecting coating on the inner surface 11 of the reflector is not harmed and a hermetical seal is obtained.

After the parts have been assembled, the enclosure 10, 20 is evacuated and may be filled with an inert gas through the exhaust tube 14 which is then sealed off as shown in the drawing and serves as one of the terminals for conducting current to the filament 16.

What I claim as new and desire to secure by Letters Patent of the United States is:

1. A light projecting device comprising a concave metal reflector, a cover glass, a metal ring sealed directly to the rim of said cover glass and united to the rim of said reflector to form a hermetically sealed enclosure, and a light source mounted in said enclosure in definite relation to the focus of said reflector.

2. A light projecting device comprising a concave metal reflector having an outwardly extending flange at the rim thereof, a cover glass, a metal ring sealed directly to the rim of said cover glass and having an outwardly extending flange portion united to the flange on said reflector to form a hermetically sealed enclosure, and a light source mounted in said enclosure in definite relation to the focus of said reflector.

3. A light projecting device comprising a concave metal reflector, a cover glass sealed over the front of said reflector to form a hermetically sealed enclosure, a metal exhaust tube sealed in an opening at the back of said reflector and insulated therefrom, a light source in said enclosure located in definite relation to the focus of said reflector, and a pair of leads supporting said light source, one of said leads being secured to said reflector and the other to said metal exhaust tube.

4. In a light-projecting device, the combination of a hermetically sealed enclosure containing a light source, said enclosure comprising a metal portion at least part of which is shaped to constitute a concave reflector, another portion of said enclosure being a glass cover, said glass cover being fused at its periphery directly to a part of the metal portion of said enclosure to form a hermetical seal.

5. In a light-projecting device, the combination of a hermetically sealed enclosure containing a light source, said enclosure comprising a metal portion at least part of which is shaped to constitute a concave reflector, another portion of said enclosure being a glass cover, said glass cover being fused at its periphery directly to a part of the metal portion of said enclosure to form a hermetical seal, said reflector portion of said enclosure having a sealed exhaust opening at its apex.

6. In a light-projecting device, the combination of a hermetically sealed enclosure containing a light source, said enclosure comprising a metal portion at least part of which is shaped to constitute a concave reflector, another portion of said enclosure being a glass cover, said glass cover being fused at its periphery directly to a part of the metal portion of said enclosure to form a hermetical seal, said reflector portion of said enclosure having a metal exhaust tube sealed in an opening at its apex.

7. In a light-projecting device, the combination of a hermetically sealed enclosure comprising a metal portion at least part of which is shaped to constitute a comparatively deep concave reflector, another portion of said enclosure being a glass cover, said glass cover being fused at its periphery directly to a part of the metal portion of said enclosure to form a hermetical seal, and a light source sealed in said enclosure and positioned intermediate the bottom and the rim of said reflector portion in accurate relation with respect to the surface of said reflector portion.

DANIEL K. WRIGHT.